United States Patent Office 3,658,936
Patented Apr. 25, 1972

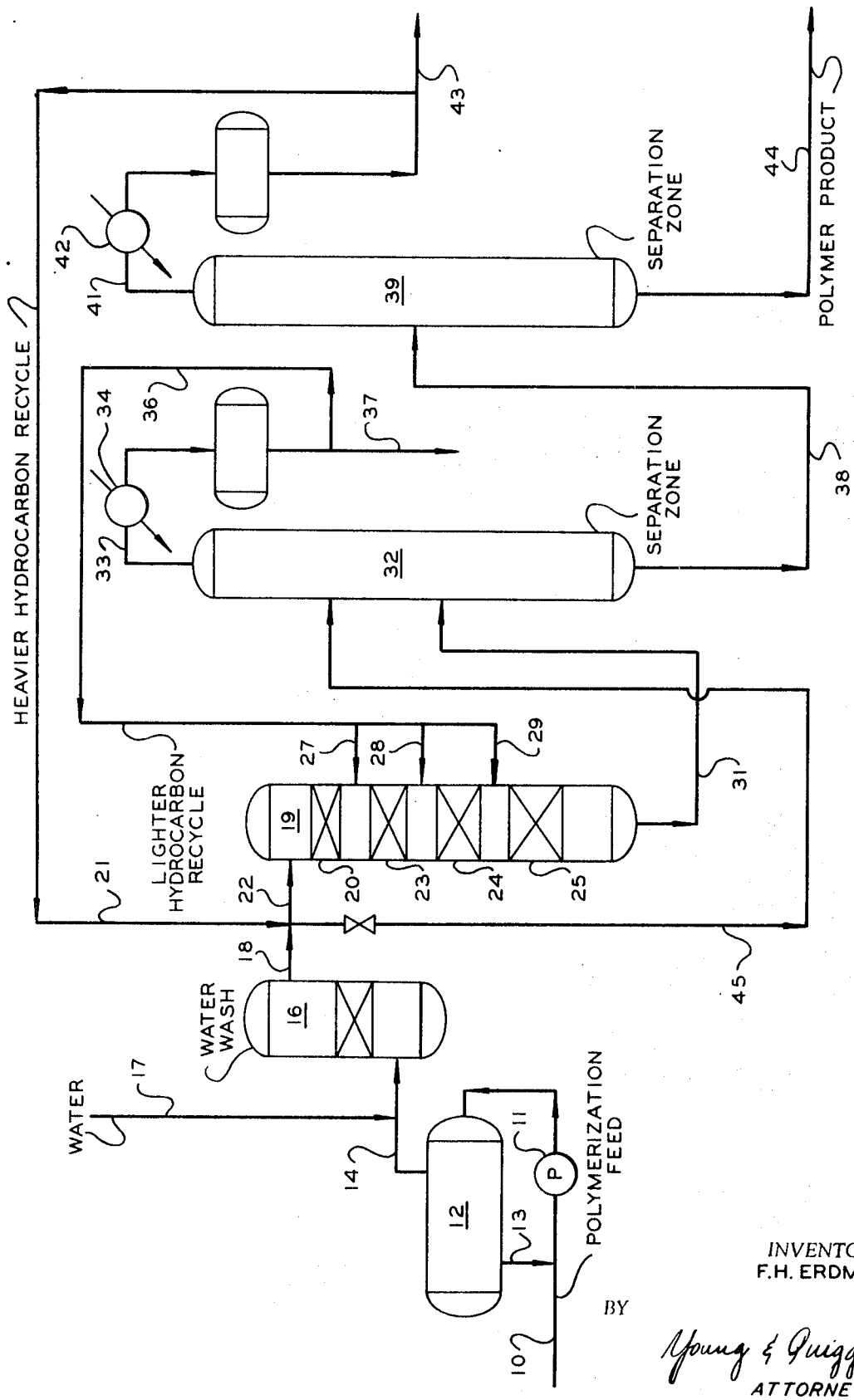

3,658,936
CATALYTIC POLYMERIZATION
Fred H. Erdmann, Great Falls, Mont., assignor to
Phillips Petroleum Company
Continuation of application Ser. No. 598,681, Dec. 2,
1966. This application Oct. 31, 1969, Ser. No. 871,782
Int. Cl. C07c 3/16
U.S. Cl. 260—683.15 C                    4 Claims

ABSTRACT OF THE DISCLOSURE

A method of controlling the reaction temperature of olefins during polymerization in a polymerization zone by removing lighter hydrocarbons from a first separation zone in an amount sufficient to control the temperature in the polymerization zone, cooling said removed light hydrocarbons and introducing the cooled lighter hydrocarbons back into the polymerization zone.

---

This application is a continuation of copending application Ser. No. 598,681, filed Dec. 2, 1966, now abandoned.

In one aspect this invention relates to polymerization. In another aspect this invention relates to controlling the temperature of olefin polymerization reactions. In another aspect this invention relates to producing hydrocarbon compounds boiling in the gasoline range from normally gaseous unsaturated hydrocarbons.

Catalytic polymerization can be used to upgrade light olefins into gasolines of relatively high octane values and low vapor pressure, providing an attractive process addition to a refinery. Propylene and butylenes-rich olefins are the usual polymerization feedstocks, the resulting polymer being suitable as gasoline or for blending with other gasolines.

Polymerization is a highly exothermic reaction and reactor engineering design is dictated by heat removal considerations. Reactors are generally either chamber, in which the heat is removed by dilution or quenching, or tubular, in which heat is removed by exchange through walls. A common chamber type of reactor is a cylindrical pressure vessel containing a number of grids on which catalyst is supported; reactants pass down flow through the series of grid-supported beds and the heat of reaction is absorbed by the addition of a quench medium between individual catalyst beds. Sizable quantities of quench medium are used since the heat of polymerization reaction is about 400 to 600 B.t.u.'s per pound of olefin reactant.

It is an object of this invention to polymerize olefins.
Another object of this invention is to control polymerization reaction temperatures.
Another object of this invention is to reduce the amount of quench medium necessary to control the reaction temperature during polymerization of a given amount of olefins.

These and other objects will be apparent to one skilled in the art upon consideration of the specification, drawings, and claims.

According to the invention, unsaturated normally gaseous hydrocarons are polymerized under polymerization conditions in a multistage polymerization zone containing a polymerization catalyst, the normally gaseous heavier olefin hydrocarbon fraction which is more easily polymerized being selectively polymerized in a first stage and the lighter normally gaseous olefin hydrocarbon fraction which is more difficultly polymerized being polymerized in a subsequent stage or stages, unreacted lighter hydrocarbon fraction is separated from the polymerization effluent in a first separation zone and cooled to a desired temperature, unreacted heavier normally gaseous hydrocarbon fraction is separated from the polymerization effluent in a second separation zone and cooled to a desired temperature, product polymers are recovered from the second separation zone, a portion of the cooled, normally gaseous heavier hydrocarbon fraction containing an equilibrium amount of unreacted heavier olefins is recycled to the first stage of the polymerization zone, and a portion of the cooled lighter normally gaseous hydrocarbon fraction which can contain unreacted light olefin is recycled to the second stage or stages of the polymerization zone in an amount to cool the reaction to a desired temperature.

Further in accordance with the invention, in the method described above, a polymerization feed stream comprising saturated and unsaturated normally gaseous hydrocarbons is split, a first portion passing to the polymerization zone and a second portion passing to the first separation zone to provide recycle quench streams having an increased olefinic content.

The feed stream to polymerization can be any suitable mixture of saturated and unsaturated normally gaseous hydrocarbons. It is within the scope of this invention to polymerize hydrocarbon mixtures containing $C_2$ to $C_6$, or higher olefins. Low-boiling olefins such as those containing 3 to 5 carbon atoms per molecule can be effectively polymerized in the presence of various catalysts to produce dimers, trimers, tetramers, etc., which can then be hydrogenated to produce valuable components of high anti-knock gasolines. Mixtures of these olefins can be polymerized to produce a full-boiling motor fuel.

The heavier hydrocarbon recycle containing an equilibrium quantity of unreacted heavier olefins is charged to the first low temperature reaction stage of the polymerization zone to produce a maximum amount of polymer of the heavier olefins, which product is not subsequently damaged in the higher temperature catalyst beds of the later stages. Reduction of the amount of recycle to the first stage of the polymerization zone allows a smaller size catalyst bed to be used to polymerize equal amounts of olefins as compared with recycle of both light and heavy olefins to the first low temperature stage. The temperature of the recycle to the first stage is controlled with respect to the feed stream temperature so that the desired reaction temperature in the first stage is obtained.

The lighter hydrocarbons, which can contain unreacted lighted olefin, are recycled to the second and later stages to provide the maximum yield of polymer from the lighter olefins and to quench the polymerization reaction effluent from each stage to a desired temperature level. By separating the heavier fraction from the lighter fraction, by polymerizing the heavier olefin at the lower temperature, and by quenching the stages separately, the amount of quench stream is considerably reduced. By separating the heavier fraction from the lighter fraction of a portion of the polymerization feed stream in the separation zones, the recycle streams can be enriched in their respective olefinic content. The lighter olefin-rich quench streams then serve the dual purpose of cooling the exothermic reaction and of acting as feed streams for selective polymerization at different stages in the polymerization zone.

Referring now to the drawing wherein auxiliary equipment, such as valves, pumps, reflux lines and reboilers have been omitted for clarity, polymerization feed is transferred through conduit 10 by means of pump 11 to caustic scrubber 12 wherein impurities such as hydrogen sulfide and mercaptans are removed to provide a low sulfur polymer gasoline. If desired, the caustic solution can be removed from scrubber 12 through conduit 13, admixed with the feedstock in conduit 10 and circulated back to scrubber 12. The hydrocarbons are removed from scrubber 12 through conduit 14 to wash tower 16. The caustic treated feed is washed with water to remove any caustic entrained during the scrubbing operation. The water can be added through conduit 17, admixing with caustic treated feed in conduit 14 or can be added in the tower. Water required for the control of catalyst hydration can be dissolved in the feed in the wash tower by proper control of the water temperature.

The washed polymerization feed is transferred from wash tower 16 through conduit 18 to a multistage polymerization reactor 19. Polymerization reactor 19 contains fixed beds of catalyst. Several commercial catalysts are available, including phosphoric acid-kieselguhr, copper pyrophosphate-charcoal, and phosphoric acid-coated quartz chips or sand. The catalyst can be supported on any suitable means, for example, perforated plates or screens.

The conditions employed in the polymerization reactor will depend upon the composition of the particular feed charged to the reactor. Thus, the invention is not limited to employing any particular operating conditions in the polymerization reactor. Generally, the operating conditions in the reactor will be within the following ranges: reactor inlet temperature, 300 to 400° F.; reactor outlet temperature, 350 to 500° F.; pressure, 400 to 1000 p.s.i.a.; and a liquid hourly space velocity, 0.2 to 0.4 gallon of hydrocarbon per pound of catalyst.

The heavier hydrocarbon recycle, charged to the first stage of the polymerization zone catalyst bed 20, can be added to reactor 19, or can be recycled through conduit 21 and admixed with the polymerization feed in conduit 22 as shown in the drawing. The lighter hydrocarbon recycle quench is added to the later stages, catalyst beds 23, 24, and 25, of the polymerization reactor 19 through conduits 27, 28, and 29. Polymerization reactor 19 is illustrated as comprising four stages but it should be understood that any suitable number of stages can be used. The different stages are illustrated as being contained in one chamber but the individual catalyst beds can be located in separate chambers if desired.

Polymerization effluent comprising polymers, unreacted olefins, and sautrated light hydrocarbons is removed from polymerization reactor 19 through conduit 31 and transferred to a first separation zone 32. A lighter hydrocarbon fraction comprising light unreacted olefins and saturates is removed overhead from separation zone 32 through conduit 33 and cooled by heat exchanger 34 to a desired low temperature. Amounts of the cooled lighter hydrocarbon fraction sufficient to quench the reaction in the second and later stages of the polymerization reaction are recycled through conduit 36 to reactor 19. The excess lighter hydrocarbon fraction is recovered through conduit 37.

Effluent from which the lighter hydrocarbon fraction has been removed is transferred from first separation zone 32 through conduit 38 to a second separation zone 39 wherein the heavier unreacted hydrocarbons are removed overhead through conduit 41 and cooled by heat exchanger 42. Cooled heavier hydrocarbon fraction is recycled through conduit 21 to the first stage 20 of reactor 19 in order to produce maximum polymer from the heavier olefins. Unrecycled heavier hydrocarbons are recovered through conduit 43. Polymerized product is recovered from zone 39 through conduit 44.

If desired, the olefin content of the recycle streams can be increased by transferring a portion of the feed stream in conduit 18 through conduit 45 to first separation zone 32 wherein the lighter olefins will be recovered through conduit 33 and recycled to reactor 19. In the second separation zone 39, the heavier olefins will be recovered through conduit 41 and recycled to the first stage of reactor 19.

EXAMPLE

In an example, utilizing the system illustrated in the drawing a feed stream comprising 56 barrels per day propylene, 82 barrels per day propane, 126 barrels per day butylene, and 123 barrels per day butene flows through conduit 18 to polymerization reactor 19. Three-hundred barrels per day of recycle flowing through conduit 21 are utilized with the feed in conduit 22 The recycle stream contains 94.5 volume percent butane and 5.5 volume percent butylenes.

The polymerization reactor pressure is maintained at 800 p.s.i.g., with the first stage (catalyst bed 20) being at an inlet temperature of 300° F. Propane-propylene quench medium at a temperature of 90° F. flows through conduit 36 at a rate of 150 barrels per day, 55 barrels per day being distributed through conduit 27 to catalyst bed 23 to maintain an inlet temperature of 360° F., 50 barrels per day being distributed through conduit 28 to catalyst bed 24 to maintain an inlet temperature of 375° F., and 45 barrels per day being distributed through conduit 29 to catalyst bed 25 to maintain an inlet temperature of 390° F. After passing through separation zones 32 and 39, 158 barrels per day of polymer product are obtained.

A conventional system, operating at 800 p.s.i.g., which does not utilize the selective polymerization and quench features of the invention, but uses a mixture of hydrocarbons to quench and wherein the first stage is maintained at from 400 to 450° F. and later stages are maintained at from 425° F. to 300° F. requires 540 barrels per day at 90° F. of quench to produce 150 barrels per day of the same quality polymer product from the feed stream as described above.

Thus, it can be seen that the process of the invention produces a greater yield of polymer product while using a reduced amount of quench.

Reasonable variation and modification are within the scope of this invention which sets forth a novel method of polymerization.

What is claimed is:
1. A process for polymerizing olefins comprising:
   (1) dividing a feed stream containing propane, propylene, butane and butylenes into first and second streams, each having the same composition as the feed stream;
   (2) passing said first stream into the inlet of a multistage polymerization zone which contains a plurality of beds of polymerization catalyst in spaced relationship with one another between said inlet and the outlet of said zone;
   (3) maintaining polymerization conditions in said polymerization zone to polymerize olefins contained in said first stream, said catalyst beds being maintained at progressively higher temperatures proceeding from said inlet to said outlet;
   (4) passing an effluent stream from the outlet of said polymerization zone as a feed stream to a first fractionation column, and passing said second stream directly to said first fractionation column as a feed stream thereto;
   (5) removing an overhead stream containing propylene and propane from said first fractionation column and returning a portion thereof to said polymerization zone between at least two of the spaced catalyst beds therein;
   (6) passing a bottoms stream from said first fractionation column as a feed stream to a second fractionation column;
   (7) removing an overhead stream containing butylenes and butane from said second fractionation column and returning a portion thereof to the inlet of said polymerization zone; and
   (8) removing a bottoms stream containing a gasoline polymer product from said second fractionation column.

2. The process of claim 1 wherein portions of said overhead stream containing propylene and propane are introduced between each adjacent pair of the catalyst beds.

3. The process of claim 1 wherein said beds of catalyst comprise phosphoric acid catalyst.

4. The process of claim 1 wherein said polymerization zone is maintained at a pressure of 400 to 1000 p.s.i.g., the catalyst bed nearest said inlet is maintained in the temperature range of 300 to 400° F., and the remaining catalyst bed(s) is/are maintained in the temperature range of 350 to 500° F.

References Cited

UNITED STATES PATENTS 2,415,951   2/1947   Kirkbride et al. ____ 260—683.15
3,275,707   9/1966   Bauer _____ 260—683.15

PAUL M. COUGHLAN, Jr., Primary Examiner